(No Model.)

B. W. ANDERSON.
BICYCLE LOCKING DEVICE.

No. 561,070. Patented May 26, 1896.

WITNESSES:
Edward E. Rowland
Beatrice M. Donaldson

INVENTOR
Byron W. Anderson.
BY
A. M. Pierce,
ATTORNEY

UNITED STATES PATENT OFFICE.

BYRON W. ANDERSON, OF NEW ROCHELLE, NEW YORK, ASSIGNOR TO THE METROPOLITAN MACHINE WORKS, OF NEW YORK.

BICYCLE-LOCKING DEVICE.

SPECIFICATION forming part of Letters Patent No. 561,070, dated May 26, 1896.

Application filed December 13, 1895. Serial No. 572,024. (No model.)

*To all whom it may concern:*

Be it known that I, BYRON W. ANDERSON, a citizen of the United States, residing in New Rochelle, in the county of Westchester and State of New York, have invented a new and useful Improvement in Bicycle-Locking Devices, of which the following is a specification.

My invention relates especially to devices employed for securing the wheels of bicycles against movement when standing in an exposed or unguarded position, and has for its object the provision of a simple, cheap, and effective lock or securing device adapted and arranged to secure both of the wheels of a bicycle against rotation.

To attain the desired end, my invention consists, essentially, of a lazy-tongs arrangement of levers provided at each extremity with hooks adapted and arranged to engage with the rims of both of the wheels of a bicycle, or with one of the wheels and the driving-sprocket, and be locked in such position, preventing the possible rotation of the wheels; and my invention also involves certain other novel and useful combinations or arrangements of parts and peculiarities of construction and operation, all of which will be hereinafter first fully described, and then pointed out in the claims.

Figure 1:
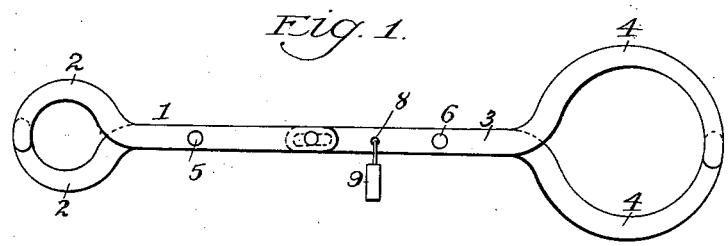
Figure 2:
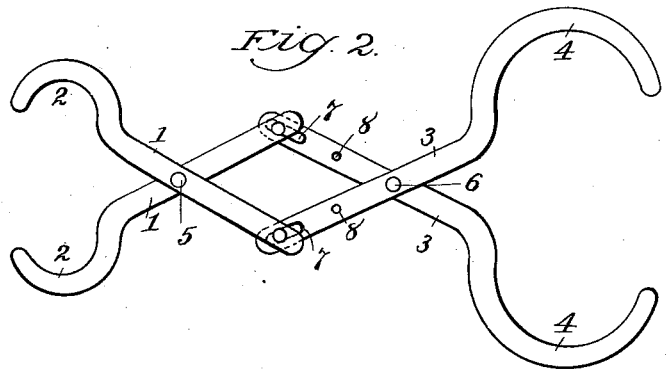
Figure 3:
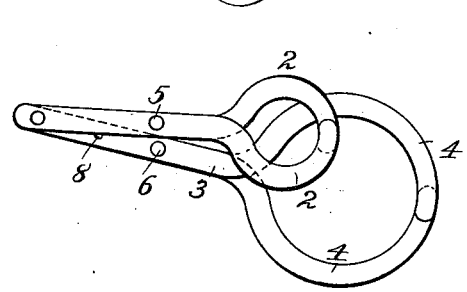

In the accompanying drawings, forming a part hereof, Figure 1 is a plan view of my bicycle-lock with the parts closed as when in use upon a bicycle. Fig. 2 is a plan view of the same, showing the grasping and holding hooks as opened. Fig. 3 illustrates the locking device as folded up for carrying when not in use.

Like numerals of reference, wherever they occur, indicate corresponding parts in all of the figures.

1 are shanks bearing hooks 2, the pieces being preferably stamped or struck out of sheet-steel or the equivalent. 3 are similar shanks, provided with hooks 4, larger than the hooks 2. The shanks 1 are movably pivoted together at 5, and the shanks 3 are pivoted together at 6 in the same manner. The shanks 3 may be slotted, as at 7, so as to permit a slight alteration or adjustment of the length of the device.

8 are perforations which register with each other when the locking device is straightened out, and will receive the hasp of a securing-lock, as 9, Fig. 1.

It will be observed that the shanks or levers when connected as shown form a lazy-tongs arrangement in which the outer ends of the levers are formed into hooks adapted to engage with parts of the object to be locked. The levers are so arranged that the pivots which connect the adjacent ends of pairs of levers may be brought into line with each other, allowing the device, as a whole, to be folded up.

When constructed and arranged in accordance with the foregoing description, and not in use, the locking device may be folded up, as in Fig. 3, and carried in the pocket.

When it is desired to secure both of the wheels of a bicycle against revolution, the device is opened, as shown in Fig. 2, the smaller hooks made to grasp the sprocket-wheel and the larger the tire and rim of the front wheel, and the parts made to assume the position illustrated in Fig. 1, when the lock-hasp is passed through the perforations 8, locking both wheels securely against movement. By this arrangement there is no danger of theft of the bicycle, as it cannot be wheeled away in any possible manner.

Having now fully described my invention, what I claim as new therein, and desire to secure by Letters Patent, is—

1. A lock for bicycles and the like, comprising a lazy-tongs arrangement of levers, the outer ends of the levers being formed into hooks adapted to engage with the object to be locked, when brought together, and a means for securing the levers when they are brought together substantially as set forth.

2. A lock for bicycles and the like, provided at its opposite ends with hooks which are adapted to engage with the objects to be locked, the opposite hooks being connected so as to open and close simultaneously, such connections being extensible whereby the distance between the opposite hooks when closed may be changed, substantially as set forth.

3. A lock for bicycles and the like comprising two pairs of hooked levers pivoted together the ends of the levers of each pair being pivotally connected, whereby the hooked ends are caused to open and close simultaneously, and the pivots connecting the pairs of levers being in line with each other when the levers are brought together and the hooks closed, whereby the lock as a whole may be folded together in the middle, substantially as set forth.

4. A lock for bicycles and the like comprising a lazy-tongs arrangement of levers the outer ends of the levers being formed to engage with the object to be locked, the pivots connecting the adjacent ends of the levers passing through slots, and being arranged to be brought into line with each other to permit the folding of the lock, substantially as set forth.

BYRON W. ANDERSON.

Witnesses:
A. M. PIERCE,
BEATRICE M. DONALDSON.